350-164.  AU 257  EX
XR  3,617,354

[11] 3,617,354

[72] Inventors Walter H. Carnahan;
 Donald R. Morey; Robert G. Spahn, all of
 Rochester, N.Y.
[21] Appl. No. 848,698
[22] Filed Aug. 8, 1969
[45] Patented Nov. 2, 1971
[73] Assignee Eastman Kodak Company
 Rochester, N.Y.

[54] PHOTOGRAPHIC PRINTS COATED WITH ANTIREFLECTION LAYER
 5 Claims, No Drawings
[52] U.S. Cl......................................... 117/76 P,
 117/33.3, 117/45, 117/75, 117/76 T, 117/93.1 GD, 117/93.1 PF, 117/93.31, 117/119, 204/192
[51] Int. Cl........................................ B44d 1/14,
 G03c 11/08
[50] Field of Search.................................. 117/76 P,
 76 T, 76 F, 33.3, 93.31, 93.1 GD, 93.1 PF;
 204/192; 350/164

[56] References Cited
UNITED STATES PATENTS

| | | | |
|---|---|---|---|
| 2,536,764 | 1/1951 | Moulton.................. | 117/69 |
| 3,297,465 | 1/1967 | Connell et al............. | 117/93.31 X |
| 3,356,523 | 12/1967 | Libbert.................... | 350/164 X |
| 3,389,012 | 6/1968 | Hamm..................... | 117/93.31 X |
| 3,415,670 | 12/1968 | McDonald................ | 117/76 X |
| 3,492,215 | 1/1970 | Conant..................... | 204/192 |

Primary Examiner—William D. Martin
Assistant Examiner—Ralph Husack
Attorneys—Walter O. Hodsdon and Alfred P. Lorenzo ABSTRACT: An antireflection coating consisting of a thin transparent layer of a polymerized perfluorinated olefin is applied over the image-bearing photographic emulsion layer of a photographic print to reduce surface reflection of light and provide increased density and enhanced contrast. The antireflection layer also serves as a protective coating for the print.

PHOTOGRAPHIC PRINTS COATED WITH ANTIREFLECTION LAYER

This invention relates in general to the photographic art and in particular to photographic prints. More specifically, this invention pertains to photographic prints coated with an antireflection layer which serves to reduce surface reflection of light and thereby to enhance image contrast and density.

A photographic print is essentially comprised of an image-bearing photographic emulsion layer carried by a support which is smooth and opaque, such as photographic paper. When such a print is observed under ordinary lighting conditions, appreciable light is reflected from the external surface, i.e. from the air-emulsion layer interface. This reflected light acts to produce a glare over the surface of the print which tends to obscure detail, particularly in the regions of higher density, and degrade image quality. There is, accordingly, a need with many photographic prints for means to reduce or eliminate this glare and to render less critical the placement of the illuminating light in displaying the print.

In accordance with this invention, a photographic print is coated with an antireflection layer to overcome the problems caused by surface reflection of light. This layer is a transparent, adherent coating of extreme and controlled thinness applied over the image-bearing emulsion layer. The function of this antireflection layer is to provide light reflectance from its outer surface in such a way as to interfere destructively with the reflectance from the surface of the emulsion layer so that these two sources of reflected light tend to cancel each other. In this way, the only light which is observed by the viewer's eye is light which has penetrated the emulsion layer and is reflected by the support. Reflection of light which is independent of the image since it comes from the emulsion surface, as occurs with prints known heretofore, is substantially avoided and the annoying glare over the print surface is thereby eliminated.

Other important advantages, in addition to the elimination or reduction of surface reflection, are also provided by the use of antireflection coatings on photographic prints in accordance with the teachings provided herein. Thus, for example, the antireflection layer also serves as a protective coating for the print which protects it from water spotting, surface abrasion, and other similar damage. A further advantage is that prints of novel and attractive appearance, different from that obtainable by other known techniques, can be produced.

The antireflection coatings which are employed as a surface layer in the novel photographic prints of this invention are comprises of a polymerized perfluorinated olefin. By the term "perfluorinated olefin" is meant a fully fluorinated olefin, i.e. one in which all hydrogen atoms have been substituted by fluorine so that the compound is comprised exclusively of carbon and fluorine. This class of compounds is well known in the chemical and polymer arts. Examples of illustrative species of perfluorinated olefins useful for the purpose of this invention are tetrafluoroethylene, hexafluoropropene, octafluorobutene, and the like. Copolymers of perfluorinated olefins can also be used, for example, a copolymer of tetrafluoroethylene and hexafluoropropene.

To accomplish the purposes of this invention, the polymerized perfluorinated olefin coating is applied as a thin, continuous and uniform layer over the surface of the image-bearing emulsion layer. Polymers of perfluorinated olefins have been found to be uniquely adapted to this use as they can be applied without harming the photographic print in any way, will adhere adequately to the emulsion layer are transparent when applied in the extremely thin layer needed to serve as an antireflection coating, and function effectively to reduce surface reflection of light. Several different methods by which the coating can be applied to the emulsion surface are described hereinbelow.

It has been proposed heretofore to coat photographic prints with a reflection-reducing coating comprised of discrete, transparent, solid particles of submicroscopic size (see U.S. Pat. No. 2,536,764). However, this produces microscopic irregularities of the surface and thereby breaks up mirror reflections and reduces gloss, but at the expense of lowered densities for ordinary illumination rather than the higher densities produced by the method of this invention.

The antireflection coatings of this invention function in accordance with well-known principles of physics. Thus, a single-layer transparent coating will reduce surface reflection if the refractive index of the coating is less than that of the substrate to which it is applied and the coating is of appropriate thickness. If the index of refraction of the coating material is exactly equal to the square root of that of the substrate, then all surface reflection of light will be eliminated for that wavelength at which the product of refractive index times thickness is equal to one-quarter of the wavelength. At other wavelengths, the destructive interference between light reflected from top and bottom surfaces of the antireflection coating is not complete; but, nonetheless, there is a reduction in overall reflectivity. By selecting the optical thickness of the coating to be one-quarter of a wavelength for approximately the midpoint of the visible light wavelength range, that is one-quarter of 5500 Angstroms or about 1400 Angstroms, the reduction in reflectivity will be optimized. The term "optical thickness," as employed herein, is intended to mean the product of the physical thickness times the refractive index of the coating.

The image-bearing layer in photographic prints is, in most instances, a gelatin layer and while the refractive index of gelatin layers employed in photographic elements will vary to some degree, depending on the particular emulsion involved, a typical value is about 1.5. A layer of polymerized perfluorinated olefin applied over the image-bearing emulsion layer will have a lower refractive index than a gelatin layer and thus be capable of functioning as an antireflection coating. While coatings of polymerized perfluorinated olefins do not have a refractive index which approaches the ideal value for this use, i.e., a refractive index which is the geometrical mean of the emulsion layer and the surrounding air and thus of about 1.23 in the case of an emulsion layer having an index of 1.5, they do have a sufficiently low refractive index to render them useful as antireflection coatings on photographic prints while at the same time meeting all other requirements for this use. Typically, the refractive index of a coating of polymerized perfluorinated olefin will be from about 1.35 to about 1.45.

While, as indicated above, there is a certain degree of choice as regards the thickness of the antireflection coating employed in the novel photographic prints of this invention, the thickness chosen should be such as to eliminate a significant amount of the surface reflection and, thus, must be closely controlled. More particularly, the thickness will usually be chosen to yield minimum reflectance for wavelengths in the middle of the visible spectrum. However, in certain instances, it may be desired to select a thickness which will be adapted to eliminate light reflection at a particular region of the spectrum other than the midpoint, e.g. red light or blue light, in order to give particular optical effects. Generally speaking, in the practice of this invention the antireflection coating is applied with an optical thickness in the range from about 0.08 to about 0.2 micron and more preferably from about 0.12 to about 0.15 micron, or a preferred physical thickness of about 0.09 to about 0.11 micron. Odd multiples of quarter wavelength thickness will also provide antireflection properties, but the minimum thickness of one-quarter wavelength is preferred.

An antireflection coating composed of a polymerized perfluorinated olefin can be applied to a photographic print by the technique of evaporative deposition. In this method of coating, a polymer of the perfluorinated olefin, for example polytetrafluoroethylene, is evaporated at reduced pressures and elevated temperatures and condensed on the emulsion surface of the photographic print. Suitable pressures and temperatures for use with polytetrafluoroethylene are pressures of from about 0.001 to about 0.00001 millimeter of mercury and temperatures of from about 400° C. to about 500° C. While coatings applied by this method do not adhere strongly to the emulsion layer, they are adequate in this regard for the purposes of this invention in those instances where the photographic print will not be subjected to handling which might cause the coating to be abraded, for example, where the print is to be mounted and framed for display.

A second method of applying the antireflection coating is by application to the print of a solution of a polymerized perfluorinated olefin in a volatile solvent and evaporation of the solvent to leave an adherent film of polymer. The solution can be applied by known methods such as dipping, spraying, knife coating, and the like. This method also suffers from the disadvantage that the coating is not strongly bonded to the emulsion surface.

A more preferred method of applying the antireflection coating to a photographic print is by glow discharge polymerization of the perfluorinated olefin monomer, e.g. glow discharge polymerization of tetrafluoroethylene. This method of coating is well known. The method, as described in published literature, involves introducing the perfluorinated olefin monomer at a pressure of about 0.5 to about 5 millimeters of mercury into a vacuum chamber containing two parallel electrodes spaced about 1 centimeter apart. An alternating current or direct current field of the order of several hundred volts is imposed on the electrodes to form a luminous gaseous discharge and a uniform polymeric film of the monomer is deposited upon the electrodes or upon a substrate placed between the electrodes. Glow discharge coating may also be carried out using high-frequency electrodeless discharge. Glow discharge coating has been described in a number of articles published in technical journals so that detailed description need not be provided herein. For details of the method, reference can be made to the following publications:

J. Goodman, J. Polymer Sci., 44, 551 (1960)

A. Bradley and J. P. Hammes, J. of Electrochem. Soc., 110, No. 1, 15 (1963)

A. Bradley and J. P. Hammes, J. of Electrochem. Soc., 110, No. 6, 543 (1963)

R. M. Brick and J. R. Knox, Modern Packaging, 123–128 Jan., 1965

T. Williams and M. W. Hayes, Nature, 209, 769 (1966)

In carrying out glow discharge polymerization coating of photographic prints in accordance with this invention, it is preferred to operate at monomer gas pressures of 0.0005 millimeter to 2 millimeters with the print spaced a distance of from 3 to 7 centimeters from the radiofrequency electrode. Operation at pressures higher than the aforesaid range is disadvantageous as it leads to polymer films of higher index of refraction. Moreover, it is most advantageous to maintain the spacing at 3 to 4 centimeters since as the spacing is increased the polymer film which is formed shows a considerably reduced durability to wiping. The presence in the perfluorinated olefin monomer of impurity gases, such as Ar, $H_2$, He, $N_2$, $O_2$ or $N_2O$, should be avoided since even small amounts of such gases will lead to formation of a polymer film with a significantly higher index of refraction.

The preferred method of applying to photographic prints the antireflection coatings of this invention is by radiofrequency induced plasma sputtering. This is also a well-known process for formation of thin films which has been described in numerous technical publications. Basically, this process involves placing the object to the coated in a vacuum chamber closely adjacent to a "target" which takes the form of a sheet of the material to be deposited, for example a sheet of polytetrafluoroethylene, introducing an inert sputtering gas such as argon, and applying a radiofrequency current to form a luminous plasma. Fast moving electrons within the plasma collide with atoms of the sputtering gas changing them to positively charged ions which strike the sheet of coating material and knock out atoms of this material which attach themselves to the surface being coated to form an adherent polymerized film. For details of this coating method, reference can be made to the publication, "Advances in R. F-Induced Plasma Sputtering" by Frank Kloss and Lawrence Herte, SCP and Solid State Technology, 45, Dec., 1967.

It is preferred to utilize the aforesaid sputtering process in applying antireflection coatings of polymerized perfluorinated olefins to photographic prints because this method provides good adhesion of the coating to the image-bearing emulsion layer while exerting only a slight detrimental effect on the refractive index of the coating. Preferred operating conditions include the use of argon at a pressure of about 0.001 to about 1 millimeter of mercury as the sputtering gas and a current with a radiofrequency of 13.56 megacycles/second. Reflectance monitoring or timing equipment of conventional type can be used to stop the deposition when the appropriate thickness has been reached.

The antireflection coatings of this invention can be applied to any photographic print regardless of the type of support or the composition of the photographic emulsion. The sole limitation in this regard is the requirement that the refractive index of the antireflection coating be less than that of the image-bearing layer of the print, as hereinbefore explained. Thus, for the purposes of this invention, the photographic print can be any of the conventional black-and-white prints or the multilayer color prints known to photography and it can have been processed by any of the conventional methods of photographic processing. Photographic elements for preparation of black-and-white prints usually comprise a single gelatin-silver halide emulsion layer, but may include one or more other layers which are not radiation sensitive. Typical photographic elements from which color prints are prepared comprise superposed red, green and blue light-sensitive silver halide emulsion layers containing, respectively, a cyan-forming coupler, a magenta-forming coupler and a yellow-forming coupler. In addition to the support and one or more photographic emulsion layers, the photographic prints of this invention may also include subbing layers, filter layers, antistatic layers, anticurl layers, and the like.

The image-bearing layer is typically a silver halide-gelatin emulsion layer but other hydrophillic colloids in addition to gelatin are sometimes employed in the manufacture of photographic elements and prints including such materials are intended to be included within the scope of this invention. Examples of such colloids are protein derivatives, cellulose derivatives, polyvinyl alcohol, polyacrylamide, polyvinylpyrrolidone, and the like. The support which carries the emulsion layer in a photographic print is typically a baryta-coated photographic paper but other opaque supports may also be used. Examples of suitable supports in addition to baryta-coated paper include cloth, cardboard, paper coated with a layer of an alpha-olefin such as polyethylene or polypropylene, paper coated with a cellulose ester such as cellulose acetate, cellulose acetate propionate or cellulose acetate butyrate, paper coated with a polyester such as polyethylene terephthalate or poly(1,4-cyclohexanedimethylene terephthalate), metal plates, metal foils such as aluminum foil or zinc foil, and laminates of paper and metal foil.

As will be readily understood by those skilled in the photographic art, this invention provides an easy, inexpensive and effective means of improving the quality of photographic prints. Application of the antireflection coating to the print surface may be effected in a batch process, in a continuous process in which the prints are in single sheet form and are conveyed through the coating apparatus, or in a continuous process in which the prints are in a continuous roll form with the roll being unwound, coated and then rewound. By means of this invention, maximum quality and detail of the image are obtained, the print can be effectively displayed independent of the placement of light relative to the observer, and the necessity to use high-intensity special illuminants is reduced or eliminated. Moreover, the appearance of the print is more nearly the same for observers at any position relative to the surface. A novel matte appearance which is particularly desired in certain classes of photographic prints is provided by the antireflection layer. A particular advantage is provided by use of the invention with prints prepared from textured photographic papers as such prints are often deficient in density and providing them with an antireflection coating will bring about a substantial increase in the maximum density.

The invention is further illustrated by the following examples of its practice.

EXAMPLE 1

Processed "step tablets" prepared from six conventional photographic print papers of different types were coated with an antireflection coating of polytetrafluoroethylene deposited by evaporating the polymer at a pressure of 0.001 to 0.0001 millimeter of mercury and a temperature of 400° to 500° C. and condensing the vapors on the emulsion surface of the step tablet. Deposition times of 2 to 3 minutes were employed. The step tablets were partially masked prior to coating to enable comparative density traces on the coated and uncoated portions to be run. In the coated area, all of the papers showed a considerable increase in maximum density and a matte appearance that made them insensitive to glare reflected from overhead lights. The D-max was determined using a reflection densitometer and values obtained were as follows:

TABLE I

| Sample No | D-Max Uncoated | Coated | Difference |
|---|---|---|---|
| 1 | 1.55 | 1.82 | 0.27 |
| 2 | 1.85 | 1.95 | 0.10 |
| 3 | 1.58 | 1.75 | 0.17 |
| 4 | 1.80 | 1.86 | 0.06 |
| 5 | 1.55 | 1.84 | 0.29 |
| 6 | 1.50 | 1.79 | 0.29 |

EXAMPLE 2

Antireflection coatings were applied to photographic prints by glow discharge polymerization of tetrafluoroethylene and by glow discharge polymerization of hexafluoropropene. The apparatus utilized had a single radiofrequency electrode in the form of a sheet of aluminum foil sandwiched between two sheets of quartz. Coating thickness was controlled to give a coating with an optical thickness of one-quarter wave length for the midpoint of the visible range. With tetrafluoroethylene, a coating with an index of refraction of 1.37 was obtained by placing the substrate at 1½ to 3 inches from the electrode, bleeding in tetrafluoroethylene so as to maintain a pressure of 0.001 Torr, and initiating a glow discharge in the gas such that the electrode current was approximately 0.5 ma./cm.$^2$ at 2000 volts r.m.s. With hexafluoropropene, a coating with an index of refraction of 1.38 was applied using the same conditions except that the pressure of hexafluoropropene was maintained at 0.1 Torr. Essentially the same results are obtained by mixing 50 percent hexafluoropropene with 50 percent argon at a total pressure of 0.02 to 0.1 Torr.

EXAMPLE 3

Photographic prints prepared from different types of photographic paper were coated with antireflection coatings of 0.1 micron thickness and with a refractive index of 1.37 to 1.38 by radiofrequency sputtering of a sheet of polytetrafluoroethylene in argon gas at $10^{13}$ millimeter of mercury. The prints were half masked to permit comparison of density in the coated and uncoated regions. Measurements were made with four different densitometers to show the effect of the antireflection coating in different viewing situations. The D-max values obtained were as follows:

TABLE II

45–90 Densitometer

| Type of Photographic Paper | Uncoated | D-max Coated | Difference |
|---|---|---|---|
| Luster | 1.40 | 1.53 | 0.13 |
| Glossy | 2.00 | 2.00 | 0 |
| Silk | 1.84 | 1.84 | 0 |
| High Luster | 1.64 | 1.64 | 0 |

Average Room Densitometer

| Type of Photographic Paper | Uncoated | D-max Coated | Difference |
|---|---|---|---|
| Luster | 1.33 | 1.55 | 0.22 |
| Glossy | 2.04 | 2.10 | 0.06 |
| Silk | 1.58 | 178 | 0.20 |
| High Luster | 1.67 | 1.76 | 0.09 |

General Electric Total densitometer (spectrometer)

| Type of Photographic Paper | Uncoated | D-Max Coated | Difference |
|---|---|---|---|
| Luster | 1.20 | 1.41 | 0.21 |
| Glossy | 1.21 | 1.49 | 0.28 |
| Silk | 1.20 | 1.45 | 0.25 |
| High Luster | 1.15 | 1.36 | 0.21 |

General Electric Diffuse Densitometer (Spectrophotometer)

| Type of Photographic Paper | Uncoated | D-max Coated | Difference |
|---|---|---|---|
| Luster | 1.23 | 1.43 | 0.20 |
| Glossy | 1.99 | 2.00 | 0.01 |
| Silk | 1.35 | 1.56 | 0.21 |
| High Luster | 1.54 | 1.60 | 0.06 |

Consideration of the data in table II indicates that with a 45–90 densitometer, which purposely minimizes surface differences, the antireflection coating produces little increase in density, whereas the same samples show large differences with the General Electric Total Densitometer (Spectrophotometer). This total mode is like print viewing situations with high flare conditions, as in a room with light walls or outdoors on an overcast day.

The invention has been described in detail with particular reference to preferred embodiments thereof, but it will be understood that variations and modifications can be effected within the spirit and scope of the invention.

We claim:

1. A photographic print comprising a support, an image-bearing photographic emulsion layer on said support, and an antireflection coating on said emulsion layer which serves to reduce surface reflection of light, said antireflection coating consisting of a thin transparent layer of a polymerized perfluorinated olefin.

2. A photographic print as described in claim 1 wherein said antireflection coating has a uniform optical thickness within the range from about 0.08 to about 0.2 micron.

3. A photographic print as described in claim 1 wherein said antireflection coating has a uniform optical thickness within the range from about 0.12 to about 0.15 micron.

4. A photographic print as described in claim 1 wherein said perfluorinated olefin is tetrafluroethylene.

5. A photographic print as described in claim 1 wherein said perfluorinated olefin is hexafluoropropene.

* * * * *